United States Patent [19]

Meckstroth

[11] Patent Number: 4,561,627
[45] Date of Patent: * Dec. 31, 1985

[54] PILOT OPERATED FLUID CONTROL VALVE

[76] Inventor: Alan F. Meckstroth, 2310 Far Hills Ave., Dayton, Ohio 45419

[*] Notice: The portion of the term of this patent subsequent to Feb. 3, 1998 has been disclaimed.

[21] Appl. No.: 507,334

[22] Filed: Jun. 24, 1983

Related U.S. Application Data

[63] Continuation-in-part of Ser. No. 230,441, Feb. 2, 1981, Pat. No. 4,390,157, which is a continuation-in-part of Ser. No. 11,227, Feb. 12, 1979, Pat. No. 4,248,402.

[51] Int. Cl.⁴ .................... F16K 31/385; F16K 31/40
[52] U.S. Cl. ......................................... 251/11; 251/45
[58] Field of Search ................... 251/11.30, 45, 29, 46, 251/129, 141

[56] References Cited

U.S. PATENT DOCUMENTS

| 2,461,772 | 2/1949 | Ray | 251/129 |
|---|---|---|---|
| 2,572,175 | 10/1951 | McPherson | 251/30 |
| 3,443,582 | 5/1969 | Linden | 251/30 |
| 3,763,881 | 10/1973 | Jones | 251/45 X |
| 3,799,496 | 3/1974 | Esten | 251/46 X |
| 3,856,259 | 12/1974 | Doherty, Jr. | 251/11 |
| 3,873,059 | 3/1975 | Meckstroh | 251/11 |
| 4,027,848 | 6/1977 | Mundi | 251/11 |
| 4,248,402 | 2/1981 | Meckstroh | 251/45 |
| 4,295,488 | 10/1981 | Book | 251/30 |
| 4,390,157 | 6/1983 | Meckstroh | 251/30 |

FOREIGN PATENT DOCUMENTS 2438590 2/1976 Fed. Rep. of Germany ........ 251/30

Primary Examiner—James C. Yeung
Attorney, Agent, or Firm—Jacox & Meckstroth

[57] ABSTRACT

A valve body defines an inlet and an outlet with a valve seat therebetween. A flexible diaphragm valve member has an outer portion supported by the valve body and a movable inner portion which cooperates with the valve seat to control the flow of liquid from the inlet to the outlet. A small bleed hole extends through the diaphragm valve member and provides a limited flow of liquid which is adapted to be vented to the outlet through a slightly larger vent passage defined by the valve body. In one embodiment, the vent passage is opened and closed by over-center snap movement of a flexible concaved bimetal disc positioned within the vent passage. The disc is heated by a small electric resistance coil when it is desired to open the valve, and when the coil is deenergized, the disc is cooled by the liquid flowing within the vent passage. In another embodiment, the vent passage is opened and closed by a flexible member in the form of a diaphragm disposed adjacent a metal disc forming an armature for a solenoid. In a further embodiment, the vent passage is opened and closed by a snap-acting strip or disc coupled to one or more piezoelectric elements or layers and engaging the flexible member.

10 Claims, 5 Drawing Figures

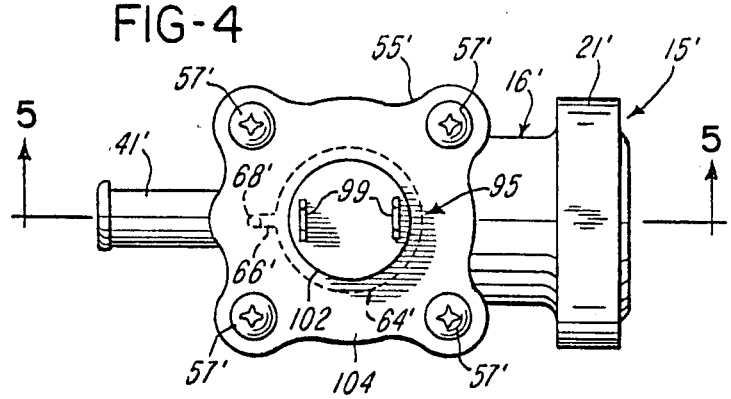
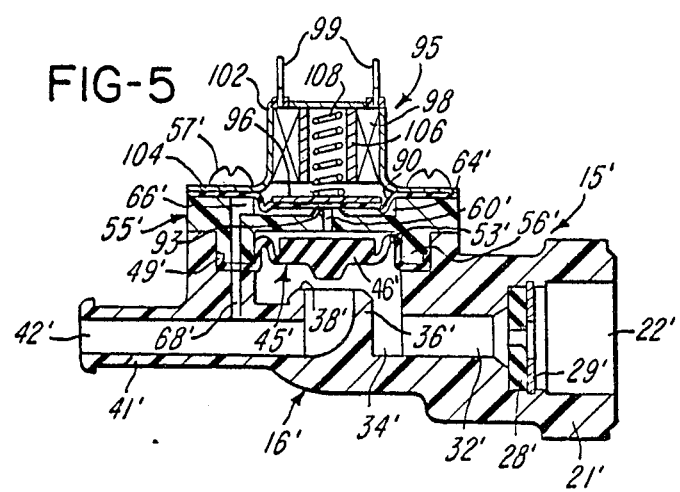

PILOT OPERATED FLUID CONTROL VALVE

RELATED APPLICATIONS

This application is a continuation-in-part of application Ser. No. 230,441, filed Feb. 2, 1981 which issued June 28, 1983 as U.S. Pat. No. 4,390,157 which is a continuation-in-part of application Ser. No. 011,227, filed Feb. 12, 1979 which issued Feb. 3, 1981 as U.S. Pat. No. 4,248,402.

BACKGROUND OF THE INVENTION

In the art of pilot operated fluid or liquid control valves such as disclosed, for example, in U.S. Pat. Nos. 3,593,957, 3,768,507 and 3,872,878, it is common to use a solenoid actuated armature or plunger for controlling the flow of liquid through a vent opening within the center of a flexible diaphragm valve member. This control of the vent opening controls the movement of the diaphragm valve member by means of differential hydraulic pressure across the valve member and thereby controls the flow of fluid through the valve.

U.S. Pat. Nos. 3,873,059 and 3,955,791, which issued to Applicant, disclose means for controlling the flow of liquid through the vent passage within the diaphragm valve member by controlling movement of the plunger in response to actuation of an elongated U-shaped bimetal element. The element is adapted to be connected as a resistance in series with an electrical load such as a motor. The pilot operated fluid control valve disclosed in Applicant's patents provides the primary advantage of reducing the production or manufacturing cost of the valve, but presents certain problems or disadvantages. For example, the pivotal pin used to move the valve plunger in response to movement of the bimetal actuating element requires a flexible pivotal seal element which is exposed to the liquid or water supply pressure. Such an exposure provides the possibility of a liquid leak from the high pressure side.

As mentioned above, the bimetal actuating element disclosed in Applicant's patents requires that the element be connected in series with another electrical load such as a motor or water heating element. Thus the bimetal actuating element cannot be connected directly to a conventional 110 volt power supply, for example, from an automatic control timer. The movement of the bimetal actuating element is also relatively slow which requires energizing the bimetal actuating element in advance of the time when it is desired for the valve to open and to de-energize the actuating element in advance of the time when it is desired for the valve to close. While it is possible to heat the bimetal actuating element by means of an electrical resistance heating coil surrounding the element, for example, as dissclosed in U.S. Pat. No. 3,643,913, so that the valve may be operated directly from a 110 volt power source, the addition of such a heating coil increases the cost of the valve assembly.

SUMMARY OF THE INVENTION

The present invention is directed to an improved pilot operated fluid control valve which is actuated by a flexible control element and which not only solves the problems mentioned above in connection with the valve disclosed in Applicant's prior patents, but also provides for further reducing the cost of manufacturing the valve. In particular, the pilot operated valve of the invention substantially eliminates the chance for a fluid leak from the high pressure supply side of the valve and is adapted to be operated directly from a 110 volt power supply. The valve also operates generally simultaneously with the control of the electrical power supply to the valve.

In accordance with the invention, the above features are generally provided by a pilot operated fluid control valve which incorporates a valve body supporting the outer portion of a flexible diaphragm valve member. The valve member moves between open and closed positions relative to a valve seat for controlling the flow of fluid from the inlet of the valve body to the outlet. A bleed hole extends through the diaphragm valve member to a chamber above the valve member, and the chamber is connected to the outlet by a vent passage defined by the valve body.

The flow of fluid through the vent passage may be controlled by actuation of a flexible concaved snap-acting stressed metal disc located adjacent the vent passage. An electrical actuating element is coupled to or positioned adjacent the disc, and the actuating element is not exposed to the liquid within the vent passage. When the actuating element is energized, the stressed metal disc snaps to a position to open the vent passage so that the pressure above the diaphragm valve member is released and the valve opens. When the actuating element is de-energized, the disc snaps or returns to its normal concaved position closing the vent passage. The flow through the vent passage is preferably controlled by a flexible diaphragm positioned under either a ferrous metal disc forming an armature for a solenoid or a snap-acting disc or strip element coupled to an electrically actuated piezoelectric element.

Other features and advantages of the invention will be apparent from the following description, the accompanying drawings and the appended claims.

BRIEF DESCRIPTION OF THE DRAWING

FIG. 4 is a plan view of a pilot operated fluid control valve constructed in accordance with another embodiment of the invention; and FIG. 5 is an axial section taken generally on the line 5—5 of FIG. 4.

DESCRIPTION OF THE PREFERRED EMBODIMENT

Figure 1:
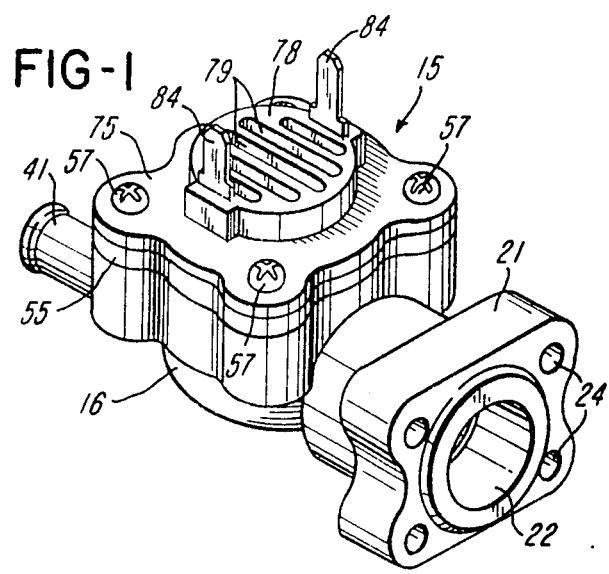
FIG. 1 is a perspective view of a pilot operated fluid control valve constructed in accordance with one embodiment of the invention.
Figure 2:
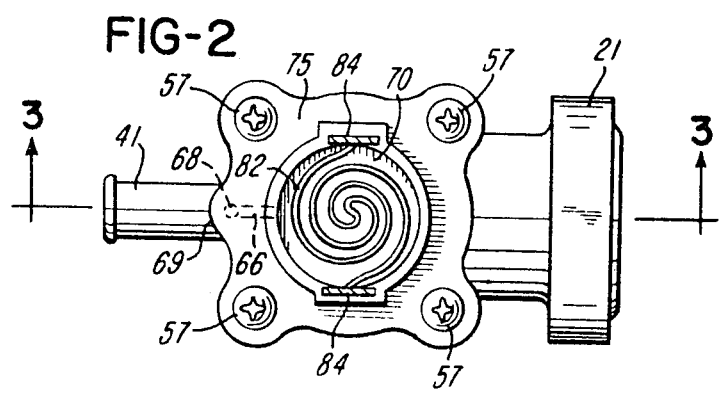
FIG. 2 is a plan view thereof with a top portion broken away.
Figure 3:
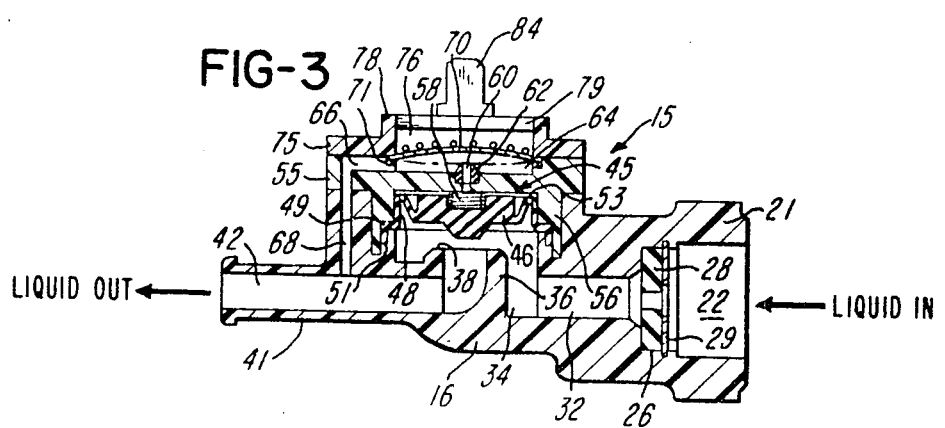
FIG. 3 is an axial section taken generally along the line 3—3 of FIG. 2 and showing the valve in its open position.

The pilot operated fluid or liquid control valve shown in FIGS. 1-3 includes a valve body 15 consisting of a base portion or section 16 which is molded of a thermoplastics material such as nylon. The base section 16 includes an inlet portion 21 which defines a cylindrical inlet chamber 22 adapted to receive a cup-shaped fine mesh screen (not shown) for filtering the fluid or water supplied to the inlet chamber 22 through a water supply line (not shown). The supply line is coupled by a fitting (not shown) to the inlet portion 21 which is supported by a support bracket (not shown) and a set of screws threaded into the holes 24 spaced outwardly of the inlet chamber 22. A counterbore 26 extends inwardly from the inlet chamber 22 and receives a rubber flow control washer 28 which automatically compensates for pressure variations in the water supplied to the inlet chamber 22. The resilient washer 28 is retained within the counterbore 26 by a C-shaped retaining ring 29.

A passage 32 extends from the flow washer 28 to a chamber 34 into which projects a portion 36 defining an annular valve seat 38. The base section 16 also includes an outwardly projecting tubular portion 41 which cooperates with the tubular portion 36 to define an outlet passage 42. A resilient flexible rubber diaphragm 45 includes a hub portion 46 which is movable to engage the valve seat 38. A flexible bellows-like flange portion 48 projects outwardly from the hub portion 46 and terminates with an integrally molded annular rim portion 49 which seats on an annular stepped surface 51 molded as part of the base section 16. A small fluid bleed hole 53 is formed within the flange portion 48 of the diaphragm 45 and has a predetermined diameter, for example, of 1/32 inch. Up to this point, the structure described is conventional in the art of solenoid actuated fluid control valves of the type referred to above.

In accordance with the present invention, the plastic valve body 15 also includes a cap-like closure section 55 which encloses the valve chamber 34 and is also molded of a plastics material which can withstand substantial heat, such as a phenolic material. The closure section 55 includes a downwardly projecting annular portion 56 which has a stepped end surface contoured to confine the outer rim portion 49 of the diaphragm 45 and compress it against the surface 51 to form an annular fluid-tight seal between the base section 16 and the closure section 55 in a conventional manner. The closure section is secured to the base section 16 by a set of screws 57 (FIG. 1). The diaphragm 45 has a cavity within the top of the hub portion 46 and confines a light stainless steel compression spring 58 which engages the inner surface of the closure section 55.

A vent port or passage 60 is formed within the center of the closure section 55 and has a diameter slightly greater than the diameter of the bleed hole 53. The vent passage is partially defined by an annular resilient valve seat 62 which is secured within a counterbore formed within the closure section 55. The vent passage 60 opens into an enlarged circular vent passage or cavity 64 defined within the top of the closure section 55. A slot or vent passage 66 connects the vent cavity 64 to a vertical vent passage 68 which is formed both within the closure section 55 and within a protrusion 69 molded as an integral part of the valve body section 16. The vent passage 68 extends to the outlet 42 so that the vent cavity 64 is always open to the low pressure or atmospheric pressure within the outlet 42.

A bimetal concaved circular disc 70 covers the circular vent cavity 64, and a resilient O-ring 71 forms a fluid-tight seal between the disc 70 and the closure section 55. The bimetal disc 70 is held against the O-ring 71 by a cover member or section 75 which defines a circular chamber 76 and is sealed to the closure section 55 to form a liquid-tight closure for the vent passages 66 and 68. Preferably, the cover member or section 75 is molded of a heat resistant plastics material such as a phenolic material and has a top circular wall 78 defining a series of parallel air vent slots 79. One source for the bimetal disc 70 is Therm-O-Disc, Incorporated, Mansfield, Ohio.

An electrical heating element or coil 82 is located within the chamber 76 and may be formed of a flexible electrical resistance wire. The ends of the wire are connected to a corresponding pair of spade terminals 84 which are supported by the cover section 75 and project upwardly in parallel spaced relation. The heating coil 82 may be supported within the cavity 76 adjacent the bimetal disc 70 or the heating coil may be attached directly to the disc, for example, by a suitable cement.

In operation of the pilot operated valve described in connection with FIGS. 1–3, the concaved bimetal disc 70 is normally in the position shown by the dotted line in FIG. 3 where the center portion of the disc engages the vent passage valve seat element 62 so that the vent passage 60 is normally closed. As mentioned above, when the vent passage 60 is closed, the diaphragm 45 is in its closed position where the hub portion 46 engages the valve seat 38. The fluid supply pressure on top of the diaphragm 45 assures that the diaphragm hub portion 46 is pressed in firm contact with the valve seat.

When it is desired to open the valve, the electrical heating coil 82 is energized by the electrical power supply which is supplied to the terminals 84. The heating of the coil 82 is effective to heat the bimetal disc 70 causing the center portion to move "over center" in a snap-action manner to the full line position shown in FIG. 3, thereby opening the vent passage 60. When the vent passage 60 opens, the hydraulic pressure above the diaphragm 45 is released through the vent passages 60, 64, 66 and 68 so that the hub portion 46 of the diaphragm moves to its open position as shown in FIG. 3. As mentioned above, the vent passage 60 is slightly larger than the bleed hole 53 so that the pressure above the diaphragm 45 cannot equalize to the pressure below the diaphragm as long as the vent passage 60 is open.

When it is desired to close the valve, the heating element or coil 82 is de-energized, and the bimetal disc 70 is cooled by the liquid flowing through the vent passage 60 and vent cavity 64. As a result, the bimetal disc 70 snaps back to its normal position closing the vent passage 60.

Another pilot operated fluid control valve constructed in accordance with the invention is illustrated in FIGS. 4 and 5 and includes a valve body 15' constructed in a manner similar to the valve body 15 described above but with some modifications. Accordingly, similar components or structure of the valve body 15' are identified with corresponding reference numbers with the addition of prime marks.

In the embodiment shown in FIGS. 4 and 5, the closure section 55' of the valve body 15' defines a circular vent cavity or chamber 64' which is connected to the outlet 42' by the vent passages 66' and 68'. The rim portion 49' of the diaphragm 45' is provided with a hole which aligns with the vent passages 66' and 68', and the rim portion 49' forms a liquid-tight seal between the closure section 55' and the base section 16' of the valve body 15'.

A second flexible diaphragm 90 has a generally uniform wall thickness and is formed of a resilient rubber, plastic or neoprene material. The diaphragm 90 has an outer peripheral portion which seats on the closure section 55' and a generally flat circular inner portion which normally seats on a valve seat projection 93 surrounding the vent passage 60'. A solenoid 95 is mounted on the valve body 15' and includes a circular armature disc 96 formed of a ferrous metal and positioned on top of the circular inner portion of the diaphragm 90. The armature disc 96 may be bonded to the upper surface of the diaphragm 90. The solenoid 95 also includes a wound coil 98 having power supply terminals 99 and enclosed within a drawn ferrous metal can or case 102.

The case 102 includes an outwardly projecting peripheral flange 104 which seats on the outer peripheral portion of the diaphragm 90 and is secured to the valve body 15' by a set of screws 57' so that the outer peripheral portion of the diaphragm 90 forms a liquid-tight seal with the closure section 55'. The solenoid 95 also includes an inner tubular pole piece 106 formed of a ferrous metal, and the pole piece 106 encloses a compression coil spring 108 which engages the armature disc 96 and exerts sufficient force so that the diaphragm 90 normally closes the vent passage 60'.

As shown in FIG. 5, the diaphragm 45' is illustrated in its open position, and the diaphragm 90 is illustrated in its closed position. When the solenoid 95 is energized, the armature disc 96 is retracted upwardly, for example, by approximately 1/16", until the armature disc 96 engages the bottom end of the inner pole piece 106 and also engages the outer metal case 102. In this retracted energized position, the armature disc 96 cooperates with the case 102 and inner pole piece 106 to form an effective flux path for the coil 98.

When the solenoid 95 is energized and the armature disc 96 is retracted upwardly, the inner portion of the diaphragm 90 also moves upwardly with the armature disc and opens the vent passage 60' so that hydraulic pressure above the diaphragm 45' is vented or exhausted through the vent passages 60', 64', 66' and 68' to the outlet 42'. When the solenoid 95 is deenergized, the spring 108 returns the armature disc 96 and the diaphragm 90 to the closed position blocking the flow through the vent passage 60'. The hydraulic pressure within the chamber above the diaphragm 45' then increases to the supply line pressure by liquid flowing through the port 53'. When the pressure above the diaphragm 45' increases to the supply line pressure, the diaphragm 45' returns to its closed position engaging the annular 38'.

The construction of the pilot operated valve shown in FIGS. 4 and 5 is desirable when it is necessary for the valve to respond instantaneously to electrical signals for opening and closing the valve. For example, the valve provides for minimizing the movement of the armature disc 96 and diaphragm 90 during opening of the valve so that the size or power of the solenoid 95 and coil 98 may be minimized. In addition, since the vent chamber 64' is always open to the low pressure outlet 42', the vent chamber 64' never receives the supply line pressure and only receives a relatively low pressure when the valve is opened so that the thickness of the diaphragm 90 and the thickness of the metal solenoid case 102 may be minimized which also helps to minimize the cost of the pilot operated valve.

As another feature, the armature disc 96 and spring 108 are never exposed to the fluid flowing through the valve and therefore may be constructed from relatively less expensive materials. As mentioned above, the flange or rim portion 49' of the diaphragm 45' not only forms a fluid-tight seal between the closure section 55' and the base section 16' of the valve body 15', but also forms a fluid-tight seal between the vent passages 66' and 68'. It is also within the scope of the invention to provide the armature disc 96 with integral spring fingers which would eliminate the need for the separate compression coil spring 108.

It is also within the scope of the invention to replace the armature disc 96 and solenoid 95 with an electrical actuator including a snap-acting strip or disc coupled to one or more piezoelectric elements or layers, for example, of the type disclosed in U.S. Pat. No. 4,383,195. The strip or disc may be of the monostable type and normally apply a pressure or force to the center of the diaphragm 90 to close the vent passage 60'. When an electrical current is supplied to the piezoelectric element, the strip or disc is forced to bend to a position where the vent passage 60' opens. When the piezoelectric element is deenergized, the strip or disc snaps to its normal position.

From the drawing and the above description, it is apparent that a pilot operated valve constructed in accordance with the present invention provides desirable features and advantages. The primary advantage is the substantial reduction in the cost of manufacturing or producing a pilot operated control valve. That is, the conventional solenoid and armature assembly of the general type as shown in above-mentioned U.S. Pat. No. 3,872,878 is replaced by either the bimetal disc 70 and heating coil 82 or by the diaphragm 90 and the simple disc-type solenoid 95 or by a snap-acting element coupled to a peozoelectric element at a significant cost savings. The use of the flexible diaphragm 90 also avoids the problem of particles within the water or liquid supply accumulating and restricting the free movement of the solenoid armature disc 96 or the snap-acting elements.

When the valve is in its closed position with the diaphragm 90 closing the vent passage 60', the small area of the vent passage minimizes the force exerted upwardly on the center of the diaphragm 90 by the pressure of the liquid or water supply which exists in the valve chamber 34' both above and below the diaphragm 45'. It is also to be understood that when the valve is used for controlling the flow within a hot water supply line, the temperature for actuating the bimetal disc 70 is substantially above the hot water supply so that when the heating coil 82 is de-energized, the hot water will quickly cool the disc to produce a snap-action movement of the disc to its position closing the vent passage 60.

While the valves are illustrated in FIGS. 1–5 with the outlet 42 or 42' aligned with the inlet 32 or 32' for convenience in molding the vent passage 68 or 68', it is within the scope of the invention to form the outlet 42 or 42' perpendicular with the inlet 32 or 32' and to form the vent passage 68 or 68' by some other means, for example, by a small cuverd tube which is placed as an insert within the mold for the valve body section 16. It is also within the scope of the invention to use other means for heating the bimetal disc 70 in place of the electrical resistance wire heating coil 82. As mentioned above, the heating element 82 may be supported within the chamber 76 and not in direct contact with the bimetal disc 70 and may be constructed of other electrical resistance material. The wattage of the heating element 82 and the specific materials for the bimetal disc 70 are selected according to the liquid being controlled and the extent of heat transfer from the heating element to the disc and from the disc to the liquid in the vent cavity 64.

While the pilot operated valves herein described and their methods of construction constitute preferred embodiments of the invention, it is to be understood that the invention is not limited to the precise forms and methods described, and that changes may be made therein without departing from the scope and spirit of the invention as defined in the appended claims.

The invention having thus been described, the following is claimed:

1. A pilot operated liquid control valve comprising a valve body having means defining an inlet and an outlet with a valve seat therebetween, a flexible diaphragm valve member having an outer portion supported by said valve body and a movable inner portion cooperating with said seat to control the flow of liquid from said inlet to said outlet, means defining a bleed hole for directing a limited flow of liquid from an inlet chamber on one side of said diaphragm valve member to a second chamber on the other side of said valve member, means defining a vent passage for directing liquid from said second chamber around at least said inner portion of said diaphragm valve member to said outlet and providing for the release of liquid flowing through said bleed hole, a snap-acting control member disposed for controlling the flow of liquid through said vent passage and flexible between an open position permitting the flow of liquid through said vent passage into said second chamber and a closed position stopping the flow of liquid through said vent passage, means for sealing said control member to prevent the liquid within said second chamber from contacting an outer portion of said control member, and electrically operated means for flexing said control member to effect snap-acting movement between said closed and open positions.

2. A pilot operated valve as defined in claim 1 wherein said control member comprises a snap-acting stressed sheet metal element, and said element has a movable intermediate portion disposed for opening and closing said vent passage.

3. A pilot operated valve as defined in claim 1 wherein said valve body comprises a base section and a closure section, said diaphragm valve member having a peripheral portion sealed between said base and closure sections, said closure section includes means defining a portion of said vent passage, said control member is supported by said closure section, and said control member includes a snap-acting stressed sheet metal portion effective to open and close said vent passage.

4. A pilot operated valve as defined in claim 1 wherein said control member comprises a stressed sheet metal element, and said electrically operated means comprise piezoelectric means coupled to said sheet metal element.

5. A pilot operated valve as defined in claim 1 wherein said control member comprises a flexible stressed disc having a peripheral portion supported by said valve body, and said disc includes a movable center portion positioned to open and close said vent passage.

6. A pilot operated valve as defined in claim 5 wherein said electrically operated means are coupled to said disc.

7. A pilot operated liquid control valve comprising a valve body having means defining an inlet and an outlet with a valve seat therebetween, a flexible diaphragm valve member having an outer portion supported by said valve body and a movable inner portion cooperating with said seat to control the flow of liquid from said inlet to said outlet, means defining a bleed hole for directing a limited flow of liquid from an inlet chamber on one side of said diaphragm valve member to a second chamber on the other side of said valve member, said valve body having means defining a vent passage for directing liquid from said second chamber to said outlet, a flexible diaphragm control member including an outer portion sealed to said valve body and a movable inner portion normally positioned to close said vent passage, a snap-acting element disposed adjacent said diaphragm control member, and electrically operated means coupled to said snap-acting element for flexing said inner portion of said diaphragm control member to a position opening said vent passage when said electrically operated means is energized.

8. A pilot operated valve as defined in claim 7 wherein said snap-acting element comprise a monostable element normally urging said diaphragm control member to close said vent passage.

9. A pilot operated valve as defined in claim 7 wherein said snap-acting element comprise a flexible stressed disc having a peripheral portion supported by said valve body, and said disc includes a movable center portion positioned to move said inner portion of said diaphragm control member.

10. A pilot operated valve as defined in claim 7 wherein said snap-acting element comprise a stressed sheet metal element.

* * * * *